Figures 1, 2:
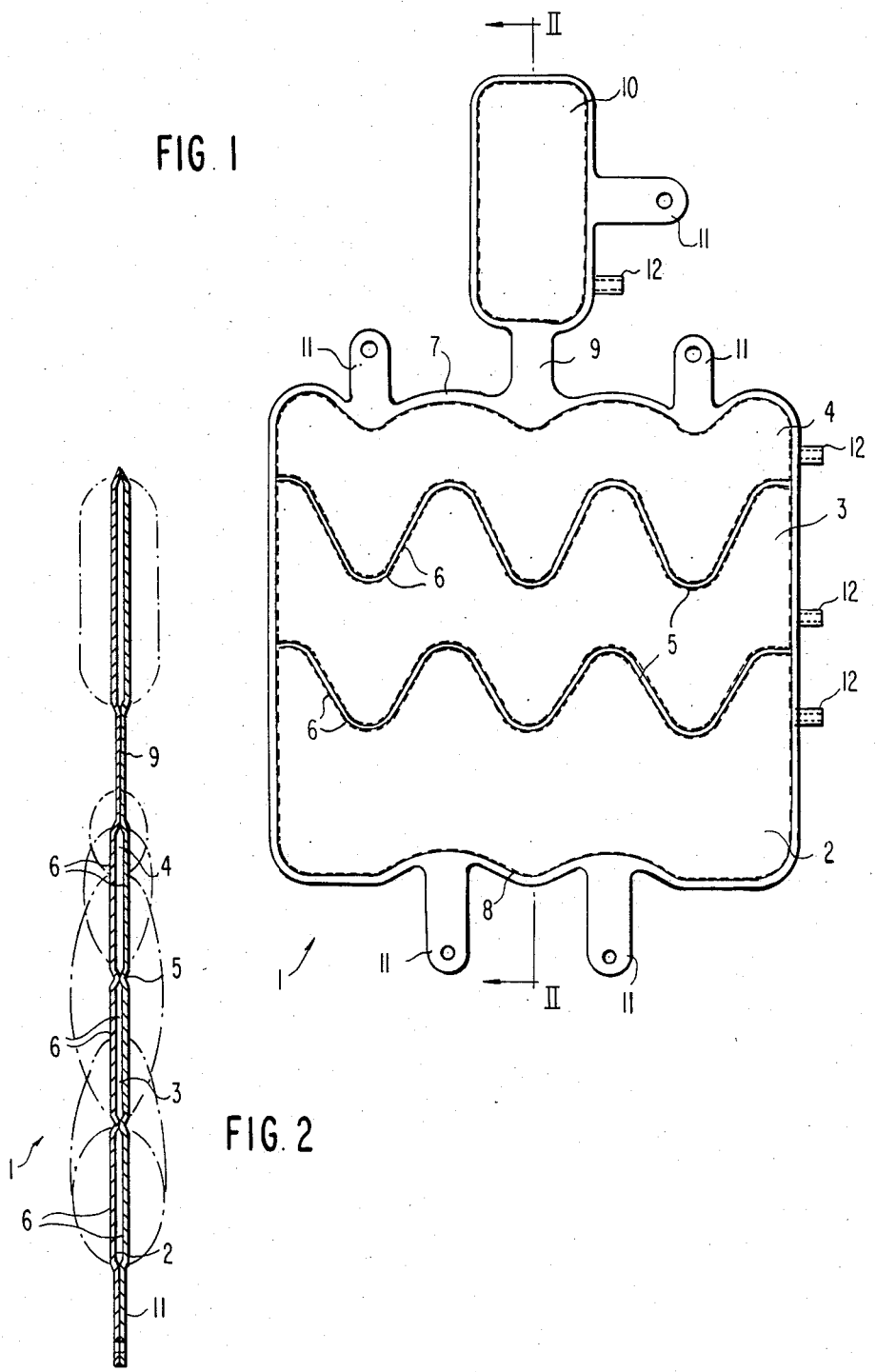

United States Patent [19]

Gmeiner et al.

[11] Patent Number: 4,497,517
[45] Date of Patent: Feb. 5, 1985

[54] MOTOR VEHICLE SEAT

[75] Inventors: Günter Gmeiner, Sindelfingen; Hermann Möller, Aidlingen; Rudolf Andres, Sindelfingen; Eberhard Faust, Stuttgart-Degerloch, all of Fed. Rep. of Germany

[73] Assignee: Daimler-Benz Aktiengesellschaft, Fed. Rep. of Germany

[21] Appl. No.: 393,597

[22] Filed: Jun. 30, 1982

[30] Foreign Application Priority Data

Jun. 30, 1981 [DE] Fed. Rep. of Germany ....... 3125588

[51] Int. Cl.³ .............................................. A47C 7/02
[52] U.S. Cl. .................................. 297/231; 297/284; 297/DIG. 3; 297/460
[58] Field of Search ......... 297/230, 231, 460, DIG. 3, 297/284

[56] References Cited

U.S. PATENT DOCUMENTS

| 2,605,818 | 8/1952 | Dabbs et al. | 297/231 |
| 2,684,672 | 7/1954 | Summerville | 297/284 |
| 3,192,541 | 7/1965 | Moore | 297/284 |
| 3,326,601 | 6/1967 | Vanderbilt et al. | 297/DIG. 3 |
| 3,348,880 | 10/1967 | Swann | 297/460 |
| 3,540,776 | 11/1970 | Wilson | 297/284 |
| 4,067,078 | 1/1978 | Winston | 297/231 |
| 4,190,286 | 2/1980 | Bentley | 297/DIG. 3 |

Primary Examiner—Francis K. Zugel
Attorney, Agent, or Firm—Craig & Burns

[57] ABSTRACT

A seat cushion adapted to be concealed in a back rest area of a motor vehicle seat includes a number of superimposed chambers, with the chambers being individually inflatable for individual support of a spinal column of the user of the seat. The individual chambers are delimited at intervals by a connecting ribs, with each connecting rib following along staggered paths and, preferably, along staggered undulating paths so that adjoining chamber walls form a tooth-like meshing. Thus, a transition area formed by the tooth-like meshing of the chambers is percieved as comfortable when the chambers are inflated to different hardnesses.

7 Claims, 2 Drawing Figures

MOTOR VEHICLE SEAT

The present invention relates to a seat and, more particularly, to a concealed cushion arranged in a backrest area of a motor vehicle seat. The cushion including at least two superimposed separately inflatable chambers which serve for individual support of a spinal column of a user of the seat. A continuous connecting rib extends between the inflatable chambers transversely of the vehicle and is formed by, for example, a welding process.

A cushion generally of the aforementioned type is proposed in, for example, Offenlegungsschrift No. 2,652,277 and offers the advantage that the user of the seat may adjust the backsupport thereof to suit personal requirements by varying the pressure in the inflatable chambers.

Practical experiences with cushions of the aforementioned type have shown that, especially when the chambers are pumped up different amounts, a sudden transition, i.e., transition area, from the softer to the harder chamber is perceived as uncomfortable. For this reason, many users of the seat tend to adjust an approximately uniform hardness whereby the effect which the cushion is intended to produce, namely, a personalizable or customizible back support is, for the most part, lost.

The aim underlying the present invention essentially resides in providing a cushion of the aforementioned type which includes at least two superimposed separately inflatable chambers, wherein support of the users back by the cushion is aways perceived as comfortable despite differences in internal chamber pressure thereby providing an optimum back support.

In accordance with advantageous features of the present invention, a cushion of the aforementioned type is proposed which is adapted to be concealed in a back rest of a motor vehicle seat. The cushion includes a continuous connecting web between the respective chambers, with each connecting rib being staggered and having, preferably, an undulating form, such that adjacent chamber walls in an area of the connecting rib mesh with one another in the manner of meshing teeth. The undulating shape of the connecting rib may be varied within relatively wide limits and may also have a meandering shape.

To further increase the comfort of the cushion, it is possible for the upper and/or lower limiting edges to be slightly undulating.

In accordance with further advantageous features of the present invention, a volume of the respective chambers decreases toward the top of the back rest thereby readily taking into account the fact that the maximum support is required in a lower area of the spinal column.

Preferably, an additional chamber is provided which is disposed further in a direction of one vertical axis of the vehicle, with this chamber being connected to the uppermost chamber by a band. This last mentioned chamber supports an area between the shoulder blades and provides for a further increase in seating comfort.

Accordingly, it is an object of the present invention to provide a cushion adapted to be concealed in a backrest area of a motor vehicle seat which avoids, by simple means, shortcomings and disadvantages encountered in the prior art.

Another object of the present invention resides in providing a cushion adapted to be concealed in a back rest area of a motor vehicle seat which is capable of providing optimum back support and comfort for a user of the seat.

Yet another object of the present invention resides in providing a cushion adapted to be concealed in a back rest area of a motor vehicle seat which is constructed so as to provide maximum support in an area of the seat which normally supports the lower area of a spinal column of a user of the seat.

A further object of the present invention resides in providing a cushion adapted to be concealed in a back rest area of a motor vehicle seat which is simple in construction and therefore relatively inexpensive to manufacture.

These and other objects, features, and advantages of the present invention will become more apparent from the following description when taken in connection with the accompanying drawing which shows, for the purpose of illustration only, one embodiment in accordance with the present invention, and wherein:

FIG. 1 is a top plan view of a cushion constructed in accordance with the present invention and having a total of four chambers; and FIG. 2 is a cross sectional view taken along the lines II—II in FIG. 1.

Referring now to the drawing wherein like references numerals are used in both views to designate like parts and, more particularly, to FIG. 1, according to this Figure, a cushion generally designated by the reference numeral 1 is formed of, for example, an elastic material such as rubber, and includes a plurality of individual chambers, 2, 3, 4, which are divided or separated by, for example, a vulcanizing or welding process. The chambers 2, 3, 4 are connected together by an undulating connecting rib 5. The undulating shape or path of the connecting rib 5 produces a teeth-like meshing of the chamber walls 6 of adjacent chambers 2, 3, and 3, 4. The spacing of the waves and height of the waves of the undulating connecting rib 5 may be modified within relatively broad limits. By virtue of the tooth-like meshing of the chamber walls 6, a transition between the adjacent chambers is perceived as comfortable even when different pressures prevail in the respective chambers.

As shown in the phantom lines in FIG. 2, the toothlike meshing of the chamber walls is also present when the cushion 1 is inflated, with the phantom lines representing the outline of the inflated cushion 1 and the solid lines illustrating the pattern or disposition of the chamber walls 6 when the cushion 1 is not inflated.

As shown in FIG. 1, the cushion 1 includes an upper limiting edge 7 and a lower limiting edge 8 with the respective limiting edges 7, 8 also following an undulating pattern so that in the transistion of the upper limiting edge and lower limiting edge, the transistion area is not perceived as being uncomfortable. An additional chamber 10 may be provided and connected by a band 9 to the upper limiting edge 7, with the additional chamber 10 being disposed in an area between shoulder blades of the user of the seat when the cushion 1 is installed in a backrest (not shown) of a motor vehicle seat.

In the cushion 1, the content or volume of the respective chambers 2, 3, 4 decrease from the bottom of the cushion 1 to the top thereof and, in order to enable a height of the cushion 1 to be adjustable to different size seat users, the limiting edges 7, 8, and upper chamber 10 are provided with tabs 11 to which appropriate tension means (not shown) may be attached, with the tension means enabling an adjustment of the disposition of the seat cushion 1 with respect to a particular user.

A suitable connection means 12 is provided and communicates each of the respective chambers 2, 3, 4, with a pressure medium source (not shown) with the pressure medium source being adapted to be controlled by appropriate control elements (not shown) so as to control individually the amount of inflation of the respective chambers 2, 3, 4, 10 of the inflatable cushion 1.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A seat cushion adapted to be concealed within a backrest portion of a motor vehicle seat, comprising at least two superimposed separately inflatable chamber means for forming a support for a spinal column of a user of the seat cushion, continuous connecting rib means extending generally transversely of the seat cushion between adjoining chamber means of said at least two superimposed chambers, said connecting rib means disposed so as to follow an undulating path such that adjoining walls of adjoining chamber means of said at least two superimposed chamber means form an area of tooth-like meshing, said area being a transition area wherein adjoining chamber means of said at least two superimposed chamber means inflated to different hardnesses are less apparent to a user supported thereby.

2. A seat cushion according to claim 1, wherein the seat cushion includes upper and lower limiting edges, said limiting edges being non-linear.

3. A seat cushion according to claim 1, wherein each chamber means of the at least two superimposed chamber means has a different volume, the respective volumes of adjoining chamber means of said at least two superimposed chambers decreasing in a direction toward a top of the seat cushion.

4. A seat cushion according to claim 1, wherein an additional chamber means is arranged so as to extend in a longitudinal direction of the seat cushion, band means being provided for connecting the additional chamber means to a top portion of the seat cushion.

5. A seat cushion according to one of claims 1, 2, 3, or 4, wherein means are provided for an attachment of an adjustment means for positioning of the seat cushion with respect to the back rest area of the motor vehicle seat.

6. A seat cushion according to claim 5, wherein means are provided for enabling the respective chamber means of said at least two superimposed chamber means to be separately connected to a pressure medium source.

7. A seat cushion according to claim 5, wherein said additional chamber means is disposed so as to be between the shoulder blades of a user supported by the seat cushion.

* * * * *